US007629425B2

(12) United States Patent
Dobrawa et al.

(10) Patent No.: US 7,629,425 B2
(45) Date of Patent: Dec. 8, 2009

(54) METHODS OF PRODUCING WATER-SOLUBLE, NON-TURBID COPOLYMERS OF AT LEAST ONE WATER-SOLUBLE N-VINYLLACTAM AND AT LEAST ONE HYDROPHOBIC COMONOMER

(75) Inventors: Rainer Dobrawa, Mannheim (DE); Ralf Widmaier, Mannheim (DE); Klaus Schnell, Neustadt (DE); Karl-Hermann Strube, Speyer (DE); Jürgen Nieberle, Wachenheim (DE); Reinhold Dieing, Speyer (DE); Bernd de Potzolli, Bad Dürkheim (DE); Andreas Gruber, Altrip (DE); Ulrich Filges, Neustadt (DE); Martin Meister, Neustadt (DE); Josef Neutzner, Neustadt (DE); Wolfgang Bouquet, Deidesheim (DE); Eberhard Schupp, Grünstadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 11/947,223

(22) Filed: Nov. 29, 2007

(65) Prior Publication Data
US 2008/0125554 A1 May 29, 2008

(30) Foreign Application Priority Data
Nov. 29, 2006 (EP) .................................. 06124999

(51) Int. Cl.
*C08F 26/10* (2006.01)
(52) U.S. Cl. .................... 526/264; 526/68; 526/70; 526/79; 526/82; 526/212; 526/330
(58) Field of Classification Search ................ 526/68, 526/70, 79, 82, 212, 264, 330
See application file for complete search history.

(56) References Cited

U.S. PATENT DOCUMENTS

| | | | |
|---|---|---|---|
| 3,513,142 A | | 5/1970 | Blumberg et al. |
| 3,862,915 A | | 1/1975 | Fried et al. |
| 4,053,696 A | * | 10/1977 | Herrle et al. .................. 526/65 |
| 4,182,851 A | | 1/1980 | Straub et al. |
| 4,520,179 A | | 5/1985 | Barabas et al. |
| 4,554,311 A | | 11/1985 | Barabas et al. |
| 4,554,312 A | | 11/1985 | Barabas et al. |
| 5,122,582 A | | 6/1992 | Potthoff-Karl et al. |
| 5,298,554 A | * | 3/1994 | Rehmer et al. ............... 524/725 |
| 5,319,041 A | | 6/1994 | Zhong et al. |
| 5,395,904 A | | 3/1995 | Zhong et al. |
| 5,502,136 A | | 3/1996 | Zhong et al. |
| 6,103,820 A | | 8/2000 | Blankenburg et al. |
| 6,369,180 B1 | | 4/2002 | Shih et al. |
| 6,512,066 B1 | | 1/2003 | Steinmetz et al. |
| 7,442,751 B2 | | 10/2008 | Dobrawa et al. |
| 7,449,531 B2 | | 11/2008 | Dobrawa et al. |
| 2007/0149735 A1 | | 6/2007 | Dobrawa et al. |
| 2007/0149736 A1 | | 6/2007 | Dobrawa et al. |
| 2007/0149737 A1 | | 6/2007 | Dobrawa et al. |
| 2007/0149738 A1 | | 6/2007 | Dobrawa et al. |
| 2007/0197767 A1 | | 8/2007 | Angel et al. |

FOREIGN PATENT DOCUMENTS

| | | |
|---|---|---|
| DE | 2 218 935 | 10/1973 |
| EP | 0 000 161 A1 | 1/1979 |
| EP | 0 418 721 A2 | 3/1991 |
| EP | 0 795 567 A2 | 9/1997 |

* cited by examiner

*Primary Examiner*—Helen L. Pezzuto
(74) *Attorney, Agent, or Firm*—Connolly Bove Lodge & Hutz LLP

(57) ABSTRACT

Methods of producing vinyllactam copolymers which include: providing at least one water-soluble N-vinyllactam; providing at least one hydrophobic comonomer; and subjecting the at least one water-soluble N-vinyllactam and the at least one hydrophobic comonomer to free-radical polymerization in an organic solvent in the presence of an initiator, under a combination of process measures selected from the group consisting of A and B; wherein:

(A) comprises (i) polymerization under reflux, and at least two of (ii), (iii), (iv), (v), (vi), and (vii), wherein (ii) comprises an addition of at least 5 mol % of N-vinyllactam to the polymerization mixture if at least 70 mol % of the total amount of hydrophobic monomer used have completely reacted, (iii) comprises return of condensate formed in the reflux from below to the polymerization mixture, (iv) comprises introduction of the initiator in the form of a solution in an organic solvent from below into the polymerization mixture, (v) comprises addition of N-vinyllactam to the reflux, (vi) comprises distilling off a portion of the organic solvent and continuing the polymerization following conversion of 70 to 99% by weight of the N-vinyllactam used, and (vii) comprises introduction of at least one monomer from below into the polymerization mixture; and wherein (B) comprises (viii) polymerization under a superatmospheric pressure such that vaporization of the polymerization components is avoided, and at least one of (i), (ii), (iii), (iv), (v), (vi), and (vii), with the proviso that a combination of (viii) with any of (i), (iii) or (v) is carried out sequentially.

22 Claims, No Drawings

METHODS OF PRODUCING WATER-SOLUBLE, NON-TURBID COPOLYMERS OF AT LEAST ONE WATER-SOLUBLE N-VINYLLACTAM AND AT LEAST ONE HYDROPHOBIC COMONOMER

BACKGROUND OF THE INVENTION

The production of copolymers from N-vinyllactams and hydrophobic comonomers by free-radical polymerization is known. The production of such copolymers takes place in an organic solvent, for example an alcohol. Usually, the polymerization is carried out with reflux of the solvent. The hydrophobic monomers which are more readily volatile than the N-vinyllactams pass, in this way, into the gas phase and into the condensate.

For many applications there is a desire for copolymers which form clear solutions in water, i.e. the FNU value of a 5% strength by weight solution should be <10, preferably less than 5. However, there is the problem that the varying reactivities and the varying polarity of the monomers can lead to increases in the concentration of the hydrophobic monomers, which has the result that non-water-soluble homopolymers can be formed from the hydrophobic monomers. Even in small amounts, depending on the comonomer in the range from 20 to 1000 ppm, such homopolymers lead to turbidity of an aqueous solution of the copolymers. The increases in the concentration of hydrophobic monomers can arise in particular in the gas phase and in the condensate, and on the reactor wall and the surface of the polymerization medium.

U.S. Pat. No. 5,395,904 describes the polymerization of vinylpyrrolidone and vinyl acetate through controlled polymerization by the feed method. An alcoholic solvent is used which can comprise up to 50% by weight of water.

U.S. Pat. No. 5,319,041 describes the preparation of copolymers of vinylpyrrolidone and vinyl acetate through polymerization by the feed method with control of the polymerization temperature.

U.S. Pat. No. 5,502,136 describes a method of producing copolymers of vinylpyrrolidone and vinyl acetate by the feed method, where the feeds are controlled via a scheme defined by certain mathematical formulae.

U.S. Pat. No. 4,520,179 and U.S. Pat. No. 4,554,311 describe the polymerization of vinylpyrrolidone and vinyl acetate with t-butyl peroxypivalate as initiator in water or water/alcohol mixtures. The initiator used therein permits the production of copolymers with a narrow molecular weight distribution, but it does not lead to water-soluble products with an FNU value <10.

EP-A 161 describes a method of producing copolymers of vinylpyrrolidone and vinyl acetate, where, after the polymerization, an afterpolymerization with certain initiators is carried out. However, the polymers have high residual contents of vinyl acetate and are not sufficiently free from turbidity.

EP-A 795 567 describes the production of copolymers of vinyllactams and hydrophobic monomers by polymerization in aqueous solution.

EP-A 418721 discloses the production of copolymers of vinylpyrrolidone and vinyl esters which dissolve in water to give clear solutions, in which, at a certain point in the polymerization, solvent exchange is undertaken in order to remove volatile constituents. This method is relatively complex.

DE-OS 22 18 935 describes the copolymerization of N-vinylpyrrolidone with various water-soluble and water-insoluble comonomers. Use is made here of water-insoluble initiators which are used in the form of a finely divided suspension in an aqueous solution of the copolymers. In the case of the water-insoluble comonomers, however, this likewise does not lead to the desired water-soluble copolymers with an FNU value <10.

BRIEF SUMMARY OF THE INVENTION

The present invention relates to methods of producing water-soluble copolymers of at least one water-soluble N-vinyllactam and at least one hydrophobic comonomer by free-radical polymerization of the monomers in an organic solvent, and to the copolymers obtainable by the methods and to their use.

The various embodiments of the present invention provide improved methods of producing copolymers of at least one hydrophilic N-vinyllactam and at least one hydrophobic comonomer by free-radical copolymerization in an organic solvent. Copolymers produced by the methods of the present invention dissolve in water to give clear solutions.

One embodiment of the present invention includes a method of producing a vinyllactam copolymer, the method comprising: providing at least one water-soluble N-vinyllactam; providing at least one hydrophobic comonomer; and subjecting the at least one water-soluble N-vinyllactam and the at least one hydrophobic comonomer to free-radical polymerization in an organic solvent in the presence of an initiator, under a combination of process measures selected from the group consisting of A and B; wherein:

(A) comprises (i) polymerization under reflux, and at least two of (ii), (iii), (iv), (v), (vi), and (vii), wherein (ii) comprises an addition of at least 5 mol % of N-vinyllactam to the polymerization mixture if at least 70 mol % of the total amount of hydrophobic monomer used have completely reacted, (iii) comprises return of condensate formed in the reflux from below to the polymerization mixture, (iv) comprises introduction of the initiator in the form of a solution in an organic solvent from below into the polymerization mixture, (v) comprises addition of N-vinyllactam to the reflux, (vi) comprises distilling off a portion of the organic solvent and continuing the polymerization following conversion of 70 to 99% by weight of the N-vinyllactam used, and (vii) comprises introduction of at least one monomer from below into the polymerization mixture; and wherein (B) comprises (viii) polymerization under a superatmospheric pressure such that vaporization of the polymerization components is avoided, and at least one of (i), (ii), (iii), (iv), (v), (vi), and (vii), with the proviso that a combination of (viii) with any of (i), (iii) or (v) is carried out sequentially.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a monomer" herein or in the appended claims can refer to a single monomer or more than one monomer. Additionally, all numerical values, unless otherwise specifically noted, are understood to be modified by the word "about."

Suitable water-soluble vinyllactams are N-vinylpyrrolidone, 3-methyl-N-vinylpyrrolidone, 4-methyl-N-vinylpyrrolidone, 5-methyl-N-vinylpyrrolidone, N-vinylpyridone, N-vinylpiperidone, N-vinylcaprolactam, preferably N-vinylpyrrolidone. The vinyllactams are used in amounts of from 30 to 90% by weight, preferably 50 to 90% by weight.

The method according to the invention is suitable for producing water-soluble polymers from monomer mixtures whose content of hydrophobic monomers is in the range from 10 to 70% by weight, preferably 10 to 50% by weight, based on the monomer mixture. Suitable hydrophobic monomers are those with a solubility in water in the range from 1 to 100 g/l. Suitable hydrophobic monomers are, for example, vinyl acetate, vinyl propionate, methyl acrylate, ethyl acrylate, n-propyl acrylate, n-butyl acrylate, t-butyl acrylate, methyl methacrylate, ethyl methacrylate, acrylonitrile or methacrylonitrile. The hydrophobic monomers are in particular those whose boiling points at atmospheric pressure are in the range of the polymerization temperature from 60 to 130° C., so that they can vaporize under polymerization conditions. Even at a boiling point slightly above the polymerization temperature (+15° C.), the hydrophobic monomer can pass into the gas phase with a solvent which boils under the polymerization conditions if the miscibility with the solvent is adequate. In particular, the hydrophobic monomer can pass into the gas phase as an azeotropic mixture with the solvent or as physical mixture with the solvent. A preferred hydrophobic monomer is vinyl acetate.

Free-radical initiators which may be mentioned by way of example are dialkyl or diaryl peroxides, such as di-tert-amyl peroxide, dicumyl peroxide, bis(tert-butylperoxyisopropyl) benzene, 2,5-bis(tert-butylperoxy)-2,5-dimethylhexane, tert-butylcumene peroxide, 2,5-bis(tert-butylperoxy)-2,5-dimethyl-3-hexene, 1,1-bis(tert-butylperoxy)-3,3,5-trimethylcyclohexane, 1,1-bis(tert-butylperoxy)cyclohexane, 2,2-bis(tert-butylperoxy)butane or di-tert-butyl peroxide, aliphatic and aromatic peroxy esters, such as cumyl peroxyneodecanoate, 2,4,4-trimethylpentyl 2-peroxyneodecanoate, tert-amyl peroxyneodecanoate, tert-butyl peroxyneodecanoate, tert-amyl peroxypivalate, tert-butyl peroxypivalate, tert-amyl peroxy-2-ethylhexanoate, tert-butyl peroxy-2-ethylhexanoate, tert-butyl peroxydiethylacetate, 1,4-bis(tert-butylperoxy)cyclohexane, tert-butyl peroxyisobutanoate, tert-butyl peroxy-3,5,5-trimethylhexanoate, tert-butyl peroxyacetate, tert-amyl peroxybenzoate or tert-butyl peroxybenzoate, dialkanoyl or dibenzoyl peroxides, such as diisobutanoyl peroxide, bis(3,5,5-trimethylhexanoyl) peroxide, dilauroyl peroxide, didecanoyl peroxide, 2,5-bis(2-ethylhexanoylperoxy)-2,5-dimethylhexane or dibenzoyl peroxide, and peroxycarbonates, such as bis(4-tert-butylcyclohexyl) peroxydicarbonate, bis(2-ethylhexyl) peroxydicarbonate, di-tert-butyl peroxydicarbonate, diacetyl peroxydicarbonate, dimyristyl peroxydicarbonate, tert-butyl peroxyisopropylcarbonate or tert-butyl peroxy-2-ethylhexylcarbonate. Readily oil-soluble azo initiators used are, for example, 2,2'-azobis(isobutyronitrile), 2,2'-azobis(2,4-dimethylvaleronitrile) or 4,4-azobis(4-cyanopentanoic acid).

The free-radical initiator used is preferably a compound selected from the group comprising tert-butyl peroxy-2-ethylhexanoate (Trigonox® 21; Trigonox® grades from Akzo Nobel), tert-amyl peroxy-2-ethylhexanoate (Trigonox® 121), tert-butyl peroxybenzoate (Trigonox® C), tert-amyl peroxybenzoate, tert-butyl peroxyacetate (Trigonox® F), tert-butyl peroxy-3,5,5-trimethylhexanoate (Trigonox® 42 S), tert-butyl peroxyisobutanoate, tert-butyl peroxydiethylacetate (Trigonox® 27), tert-butyl peroxypivalate (Trigonox® 25), tert-butyl peroxyisopropylcarbonate (Trigonox® BPIC), 2,5-dimethyl-2,5-di(tert-butylperoxy)hexane (Trigonox® 101), di-tert-butyl peroxide (Trigonox® B), cumyl hydroperoxide (Trigonox® K) and tert-butyl peroxy-2-ethylhexylcarbonate (Trigonox® 117). It is of course also possible to use mixtures of the abovementioned free-radical initiators.

The amount of initiator used, based on the monomers, is in the range from 0.02 to 15 mol %, preferably 0.05 to 3 mol %. In the method according to the invention, the initiator is used as solution, depending on the solubility, in a $C_1$-$C_4$-alcohol. In these solutions, the initiator concentration is in the range from 1 to 90% by weight, preferably 10 to 90% by weight, based on the solvent.

A suitable polymerization medium is a polar organic solvent. The solvent must be sufficiently hydrophilic that it is miscible with the vinyllactam in any mixing ratio. Furthermore, the solvent should preferably boil under the polymerization conditions so that it can form a reflux. Of suitability are, for example, aliphatic or aromatic halogenated hydrocarbons, such as chloroform, tetrachloromethane, hexachloroethane, dichloroethane, tetrachloroethane, chlorobenzene, and liquid C1- or C2-chlorofluorocarbons, aliphatic C2- to C5-nitriles, such as acetonitrile, propionitrile, butyronitrile or valeronitrile, linear or cyclic aliphatic C3- to C7-ketones, such as acetone, methyl ethyl ketone, methyl isobutyl ketone, 2- or 3-hexanone, 2-, 3- or 4-heptanone, cyclopentanone, cyclohexanone, linear or cyclic aliphatic ethers, such as diisopropyl ether, 1,3- or 1,4-dioxane, tetrahydrofuran or ethylene glycol dimethyl ether, carbonates, such as diethyl carbonate, and lactones, such as butyrolactone, valerolactone or caprolactone. Suitable monohydric, dihydric or polyhydric alcohols are, in particular, the C1- to C8-alcohols, the C2- to C8-alkanediols, and C3- to C10-tri- or polyols. Examples thereof are methanol, ethanol, n-propanol, isopropanol, n-butanol, sec-butanol, tert-butanol, n-pentanol, 2-pentanol, 3-pentanol, and ethylene glycol, propylene glycol or 1,3-propanediol.

The monoalkoxyalcohols used are, in particular, the abovementioned C1- to C8-alcohols and C2- to C8-alkanediols and C3- to C10-triols substituted by a C1- to C6-alkoxy group. Examples thereof are methoxymethanol, 2-methoxyethanol, 2-methoxypropanol, 3-methoxypropanol, 2-methoxybutanol, 3-methoxybutanol, 4-methoxybutanol, 2-ethoxyethanol, 2-ethoxypropanol, 3-ethoxypropanol, 2-ethoxybutanol, 3-ethoxybutanol, 4-ethoxybutanol, 2-isopropoxyethanol, 2-isopropoxypropanol, 3-isopropoxypropanol, 2-isopropoxybutanol, 3-isopropoxybutanol, 4-isopropoxybutanol, 2-(n-propoxy)ethanol, 2-(n-propoxy)propanol, 3-(n-propoxy)propanol, 2-(n-propoxy)butanol, 3-(n-propoxy)butanol, 4-(n-propoxy)butanol, 2-(n-butoxy)ethanol, 2-(n-butoxy)propanol, 3-(n-butoxy)propanol, 2-(n-butoxy)butanol, 3-(n-butoxy)butanol, 4-(n-butoxy)butanol, 2-(sec-butoxy)ethanol, 2-(sec-butoxy)propanol, 3-(sec-butoxy)propanol, 2-(sec-butoxy)butanol, 3-(sec-butoxy)butanol, 4-(sec-butoxy)butanol, 2-(tert-butoxy)ethanol, 2-(tert-butoxy)propanol, 3-(tert-butoxy)propanol, 2-(tert-butoxy)butanol, 3-(tert-butoxy)butanol, 4-(tert-butoxy)butanol.

Of particular suitability is a $C_1$- to $C_4$-alcohol, preferably ethanol or isopropanol. Particular preference is given to using isopropanol as solvent.

The solvent used can here comprise up to 20%, preferably up to 10%, of other constituents, but is always in the form of a uniform phase.

The polymerization is usually carried out at a neutral pH in the range from 5 to 9. If necessary, the pH is adjusted by adding a base, such as, for example, ammonia, triethylamine, triethanolamine or sodium hydroxide solution, or an acid, such as, for example, hydrochloric acid, lactic acid, oxalic acid, acetic acid or formic acid before the polymerization reaction and/or is maintained by continuous or batchwise addition during the polymerization reaction.

If lower molecular weights are desired, then these can be established by adding a regulator to the polymerization mixture. Suitable regulators are, for example, aldehydes, such as formaldehyde, acetaldehyde, propionaldehyde, n-butyraldehyde and isobutyraldehyde, formic acid, ammonium formate, hydroxylammonium sulfate and hydroxylammonium phosphate. It is also possible to use regulators which comprise sulfur in organically bonded form. These are, for example, di-n-butyl sulfide, di-n-octyl sulfide, diphenyl sulfide, diisopropyl disulfide, di-n-butyl disulfide, di-n-hexyl disulfide, diacetyl disulfide and di-t-butyl trisulfide. Preferably, the regulators comprise sulfur in the form of SH groups. Examples of such regulators are n-butyl mercaptan, n-hexyl mercaptan or n-dodecyl mercaptan. Water-soluble, sulfur-containing polymerization regulators, such as, for example, hydrogensulfites, disulfites and compounds such as ethyl thioglycolate, cystein, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, diethanol sulfide, thiodiglycol, ethylthioethanol, thiourea and dimethyl sulfoxide are particularly preferably. Also suitable as regulators are allyl compounds, such as allyl alcohol or allyl bromide, benzyl compounds, such as benzyl chloride or alkyl halides, such as chloroform or tetrachloromethane. In a preferred embodiment, the regulator, if appropriate as solution in a $C_1$-$C_4$-alcohol, is metered into the reaction mixture.

The monomers are, if appropriate as solution in a $C_1$-$C_4$-alcohol, metered into the reaction mixture (feed method). In one embodiment of the invention, up to 20 mol %, preferably up to 15 mol %, particularly preferably up to 10 mol %, of the water-soluble N-vinyllactam I (based on the total amount of N-vinyllactam I) and a small amount of the initiator solution and solvent, preferably ethanol or isopropanol, are initially introduced. The mixture is then brought to the reaction temperature and the remaining amount of monomer is metered in at the same time as the remaining initiator solution and, if appropriate, a regulator, continuously or in several portions. In general, the metered addition takes place over a period of from 2 to 14 hours, preferably 3 to 12 hours, ideally 4 to 11 hours (depending on the batch size and concentration used). The concentration of the monomers in the reaction mixture is in the range from 10 to 80% by weight, preferably 20 to 75% by weight, in particular 25 to 70% by weight, based on the reaction mixture. In this case, the initiator solution, after the reaction mixture has been brought to the desired reaction temperature, is allowed to run in continuously or in several portions, in particular over a period of from 2.5 to 16 hours, preferably 3.5 to 14 hours, in particular 5 to 12.5 hours.

The method according to the invention is carried out in such a way that the local concentration of the more hydrophobic comonomer is avoided through the combination of two or more of the measures described below under i) to viii):

i) polymerization under reflux,
ii) addition of at least 5 mol % of N-vinyllactam to the polymerization mixture if at least 70 mol % of the total amount of hydrophobic monomer used have completely reacted,
iii) return of condensate formed in the reflux from below to the polymerization mixture,
iv) introduction of the initiator in the form of a solution in an organic solvent from below into the polymerization mixture,
v) addition of N-vinyllactam to the reflux,
vi) following conversion of 70 to 99% by weight of the N-vinyllactam used, distilling off some of the solvent and continuing the polymerization,
vii) introduction of at least one monomer from below into the polymerization mixture,
viii) polymerization under a superatmospheric pressure such that vaporization of the components is avoided.

The combination is such that measure i) is combined with at least two further measures ii) to vii), or measure viii) is combined with at least one further measure, with the proviso that the combination of measure viii) with at least one of the measures i), iii) or v) is only carried out sequentially.

The individual measures can be combined here such that temporal overlaps of the individual measures in the course of the polymerization method are possible.

In what follows, the framework conditions of the polymerization reactions are firstly defined, then the individual measures and the times for carrying them out are described and then the combinations of the individual measures are given.

"Polymerization under reflux conditions" here means the following: the polymerization reaction is carried out under reflux conditions. In this connection, reflux conditions means that the liquid polymerization mixture boils and the readily volatile components such as the solvent and/or hydrophobic monomers or azeotropic mixtures of hydrophobic monomers and further components such as solvent etc. vaporize and condense again as a result of cooling. Reflux conditions are maintained by controlling temperature and pressure.

"Suitable polymerization temperatures and pressure" means here as follows: the reaction temperature is usually in the range from 60 to 120° C., although it can also be up to 150° C. The reaction can be carried out at atmospheric pressure, under autogenous pressure or under protective-gas superatmospheric pressure. In the case of superatmospheric pressure, the pressure is regulated such that boiling is still always present. The person skilled in the art can ascertain suitable pressure ranges by means of the relative vapor pressures. Usually, the pressure here will not exceed 2 MPa. The polymerization can take place at a pressure of from 0.05 to 2 MPa, preferably 0.08 to 1.2 MPa, in particular 0.1 to 0.8 MPa. On the other hand, if boiling is to be avoided, as in the case of measure viii), then the temperature and pressure range is chosen so that no vaporization of the feed substances takes place. This higher pressure, which suppresses boiling, can be achieved by adjusting the temperature at the same volume or by increasing the pressure by injecting inert gases such as nitrogen or argon, preferably nitrogen.

This pressure chosen for the polymerization is therefore lower than the pressure required for measure viii) under otherwise identical conditions.

"Containers suitable for the polymerization" here means as follows: the polymerization takes place in a tank equipped with a stirring device. Suitable stirring devices are anchor stirrers, propeller stirrers, cross-blade stirrers, MIK stirrers or other stirrers known to the person skilled in the art and suitable for the solution polymerization. Furthermore, one or more feed devices for the metered addition of the monomers, of the initiator solution and, if appropriate, of the regulator (solutions) are also present.

Furthermore, the tank in the upper region of the reactor, where no liquid polymerization mixture, but a gas phase is present, is equipped with a condenser. Under the polymerization conditions, solvents and/or hydrophobic monomers or azeotropic mixtures of hydrophobic monomers and further components such as, for example, solvents pass, on account of their relatively low boiling points, in part into the gas phase, while the higher-boiling N-vinyllactam remains largely in the liquid polymerization phase. Depending on the solvent selected, the gas phase can also consist only of hydrophobic monomer. At the condenser, the gaseous phase of solvent and/or hydrophobic monomers condenses and in so doing forms the so-called reflux.

When using pressures which are above the ambient pressure, and, if appropriate, for safety aspects, use should be made of a pressure-resistant container and, if appropriate, a likewise pressure-resistant reflux condenser located in the gas space or connected to the gas space of the tank and closed to the atmosphere. Such apparatuses are known to the person skilled in the art.

The fill level with liquid polymerization mixture is usually 50 to 95% by volume, preferably 70 to 90% by volume, of the tank volume after adding all of the feed materials.

Measure i)

The method according to the invention is carried out under reflux. Besides the solvent, the reflux also comprises vaporized monomer. Here, the fractions of more hydrophobic monomer are greater than the fractions of N-vinyllactam.

The method according to the invention is carried out so that, at the latest after 15% of the metering time of feed I during the polymerization reaction, some of the more hydrophobic monomer, if appropriate in a mixture with further reaction constituents such as solvents, e.g. as azeotrope, vaporizes and condenses again in the reaction space at a cooler position. This condensate is returned directly to the reaction mixture (reflux), such that this reflux passes from above onto the liquid level of the reaction mixture and is mixed in again.

The polymerization is carried out in a suitable container at suitable polymerization temperature and pressure.

Measure ii)

The method according to the invention is carried out such that at least 5 mol % of the N-vinyllactam are added to the polymerization mixture if at least 70 mol % of the hydrophobic monomer have completely reacted.

The polymerization is carried out in a suitable container at a suitable polymerization temperature and pressure.

In the case of measure ii) according to the invention, following polymerization of at least 70 mol % of the amount of hydrophobic monomer to be used in total for the polymerization, a further amount I of 5 to 25 mol % of the amount of vinyllactam to be used in total for the polymerization is added in such a way that the addition takes place continuously with a linear or temporally changeable material stream or batchwise in several portions, this amount I being added so that the addition of the amount I of vinyllactam is complete after 110 to 150% of the total addition time of the hydrophobic monomer. If the addition takes place continuously with a temporally changeable material stream, then at least 60% of this amount I is added to the reaction mixture within 50% of the addition time of the amount I. If the addition of the amount I takes place batchwise in several portions, then this amount is divided, depending on the absolute addition time in hours, into a number of from 3 to 7 portions of equal size such that likewise at least 60% of this amount I can be added to the reaction mixture within 50% of the addition time of the amount I, where the addition of the first portion is added to the reaction mixture at the time-point zero of the addition time of the amount I. If the addition takes place continuously with a linear material stream, then likewise at the time-point zero, the addition time of the amount I, 5 to 10% of the total amount of the amount I can be added batchwise to the reaction mixture before continuous metered addition is started.

Measure iii)

Measure iii) according to the invention is carried out in such a way that the condensate formed in the reflux is returned from below to the polymerization mixture. The polymerization is carried out in a container suitable for the polymerization at a suitable polymerization temperature and pressure.

According to measure iii) in accordance with the invention, the reflux is not allowed to flow back onto the polymerization mixture from above, as is otherwise customary, but the condensate is returned from below to the polymerization mixture via a suitable device. In this connection, from below means that the condensate comprising the hydrophobic monomers is introduced below the surface of the liquid polymerization mixture. Here, the condensate is returned in such a way that at least 90% by weight of the total reflux are returned from below at any time point. Preferably, the return takes place in the zone of greatest mixing and shearing of the liquid polymerization mixture.

Where this zone is located depends firstly on the type of stirrer used, and secondly on the reactor geometry. The zone of greatest mixing as a function of the stirrer type chosen is known to the person skilled in the art. The person skilled in the art can also ascertain this zone in a simple manner known per se, for example via computer simulation or color distribution experiments. If there is a plurality of areas of greatest or very great mixing, it may also be expedient to introduce the reflux as far as possible below the liquid level in one of these zones. This maximizes the distance between the introduction site of the initiator solution, which is usually metered in from above, and the introduction site of the reflux.

For carrying out the method according to the invention, the condenser can be laid out as an ascending condenser, which is equipped at the lower end with a barrier which acts as reflux block, over which gaseous constituents can rise upwards into the condenser, while back-running condensate passes into a pipeline and is returned from below to the reactor via this pipeline. Furthermore, the condenser can be designed as a curved tube which is initially laid out so that the end open to the gas phase of the reactor ascends upward and is heatable in order to prevent condensation of the gases rising in the pipe. In the descending part, the pipe is provided with cooling in order to condense and return the gaseous constituents.

Furthermore, the condensate can also be separated off by providing the reactor with a conventional reflux condenser, from which the reflux drips downward into a collecting device installed in the gas space of the reactor and is led away from this collecting device via a pipeline. The shape of the collecting device is not critical, any bowl-like or funnel-shaped shape is suitable. The pipeline can be run here such that the condensate is introduced again from outside. The pipeline can also be run internally through the liquid phase such that the exit opening is arranged in the zone of greatest mixing.

Of suitability in principle for condensing the vaporizing readily volatile components is any condenser irrespective of its construction. It is important that a certain reflux ratio is maintained. Thus, at most 10% by weight of the realux should pass as normal reflux onto the surface of the liquid polymerization mixture. The reflux can also be optimized by heating or effective thermal insulation of the parts of the polymerization tank that are in contact with the gas phase.

The condensate can be introduced into the liquid reaction mixture via customary valves which are suitable for introducing liquids. With the help of metering pumps, the reflux return can be metered in continuously or in pregiven metering schemes with varying feed rates and times. Return of the condensate as batch or semibatch via storage containers is also possible. In this connection, before being returned, vinyllactam can be added in a targeted way to the condensate (=combination with measure v)).

The pipeline for returning the reflux can of course also be run through moving internals (e.g. stirrers) or fixed internals (e.g. stream breakers, internal heat exchangers etc.) to this zone of great mixing. The way in which the pipeline is run here can largely be chosen freely provided introduction takes place into a zone of great mixing below the liquid level.

If there is a plurality of areas of greatest or very great mixing, it is also expedient to introduce the reflux return as far as possible below the liquid level. This maximizes the distance between the introduction site of the reflux and initiator addition. The introduction particularly preferably takes place via the bottom area of the tank. The reflux can be introduced from outside into the reaction mixture, i.e. from the tank wall, as well as from inside the tank space, by rubbing the return from the tank wall or the tank lid inward and ending within the tank space in a zone which is surrounded at all reaction times by the reaction mixture and is in a zone of the greatest possible mixing. In the case of anchor stirrers, the return can, for example, be run from above downward into the middle zone of the tank space in the vicinity of the stirrer shaft. In the case of cross-blade stirrers, the return can be run from the side of the tank wall between two blades into the middle zone. If the return is run into the reaction mixture within the tank space, then this return acts so to speak as stream breaker and thus intensifies the desired mixing. If appropriate, in the case of such an arrangement, it may be useful to incorporate a further stream breaker as counterpiece to the return in order thus to install two, for example symmetrical, stream breakers (one or, if appropriate, both thereof configured as return) in the tank. The best arrangement and configuration as a return with or without a further stream breaker is governed again, depending on the tank geometry and type of stirrer chosen, by the quality of mixing, which the person skilled in the art can easily ascertain, for example, via computer simulation or color distribution experiments.

The return can of course be run as described also through moving tank internals (such as, for example, the stirrer) or other nonmoving tank internals (such as, for example, heat exchangers etc.). Such internals are known to the person skilled in the art.

Measure iv)

Measure iv) according to the invention is carried out so that the initiator is introduced in the form of a solution in a solvent, usually an organic solvent, from below into the polymerization mixture.

The polymerization is carried out in a container suitable for the polymerization at a suitable polymerization temperature and pressure.

According to measure iv) in accordance with the invention, the initiator solution is introduced via a suitable device from below into the polymerization mixture. In this connection, from below means that the initiator solution is introduced below the surface of the liquid polymerization mixture. Preferably, introduction takes place in the zone of greatest mixing of the liquid polymerization mixture. Where this zone is located depends firstly on the type of stirrer used, and secondly on the reactor geometry. The zone of greatest mixing as a function of the stirrer type chosen is known to the person skilled in the art. The person skilled in the art can also ascertain this zone in a simple manner known per se, for example via computer simulation or color distribution experiments.

The initiator solution can be introduced into the liquid reaction mixture via customary valves suitable for introducing liquids. With the help of metering pumps, the initiator solution can be metered in continuously or in pregiven metering schemes with varying feed rates and times.

The pipeline for introducing the initiator solution can of course also run through moving internals (e.g. stirrers) or fixed internals (e.g. stream breakers, internal heat exchangers etc,) to this zone of great mixing. The way in which the pipeline is run here can largely be freely chosen provided the introduction takes place into a zone of great mixing below the liquid level.

If there is a plurality of areas of greatest or very great mixing, it is also expedient to introduce the initiator solution as far as possible below the liquid level. This maximizes the distance between the introduction site of the initiator solution and of the reflux. The introduction particularly preferably takes place via the bottom area of the tank. The initiator solution can be introduced from outside into the reaction mixture, i.e. from the tank wall, as well as from inside the tank space, by running the metering line from the tank wall or the tank lid inward and ending within the tank space in a zone which is surrounded at all reaction times by the reaction mixture and is in a zone of greatest possible mixing. In the case of anchor stirrers, the metering line can, for example, be run from above downward in the middle zone of the tank space in the vicinity of the stirrer shaft. In the case of cross-blade stirrers, the metering line can be run from the side of the tank wall between two blades into the middle zone. If the metering line is run within the tank space into the reaction mixture, then this metering line acts as it were as stream breaker and thus intensifies the desired mixing. If appropriate, in the case of such an arrangement, it may be useful to incorporate a further stream breaker as counterpiece to the metering line in order thus to install two, for example symmetrical, stream breakers (one or, if appropriate, both thereof configured as metering line) in the tank. The best arrangement and configuration as a metering line with or without a further stream breaker is governed again, depending on the tank geometry and type of stirrer chosen, by the quality of mixing, which the person skilled in the art can easily ascertain, for example, via computer simulation or color distribution experiments.

The introduction as described can of course also be run through moving tank internals (such as, for example, the stirrer) or other nonmoving tank internals (such as, for example, heat exchangers etc.). Such internals are known to the person skilled in the art.

Measure v)

Measure v) according to the invention is carried out such that N-vinyllactam is added to the reflux.

The polymerization reaction is carried out under reflux conditions at a suitable polymerization temperature and pressure in a container suitable for the polymerization.

According to measure v) in accordance with the invention, vinyllactam is added to the reflux. The amount of vinyllactam here is chosen so that the amount of vinyllactam which is consumed per time unit by polymerization is added in part or completely to the reflux of hydrophobic monomer and thus is introduced into the reaction mixture in the tank. By contrast, the amount of hydrophobic monomer consumed in each case per time unit is added directly to the reaction mixture. The amount of vinyllactam consumed per time unit can be calculated using the copolymerization parameters or can be discontinuously or continuously determined during the experiment by sampling. Determination can take place, for example, by in-process control using suitable methods known to the person skilled in the art, such as GC, IR, HPPC etc. The parameters of relevance for the calculation are the copolymerization parameters of the monomers used and the equations required for the calculation, which are accessible to the person skilled in the art from known textbooks and publications. Separate calculation depending on the choice of monomers is easy to carry out for the person skilled in the art.

The method is accordingly carried out in such a way that some of the vinyllactam is added directly to the reaction mixture, if appropriate some is metered directly into the reaction mixture, and some is added via the reflux of the hydrophobic monomer from the condenser. Some of the hydrophobic monomer is added directly to the reaction mixture, and some is subsequently metered in during the course of the reaction according to consumption, there always being some of the hydrophobic monomer in the gas phase and in the reflux until the end (complete conversion) of the polymerization.

Within the scope of the invention, it is likewise possible that the metered addition of the vinyllactam to the reflux of hydrophobic monomer or monomer and solvent takes place only toward the end of the reaction when the majority of monomers through normal metering directly into the reaction mixture has taken place and the majority of vinyllactam has been consumed by polymerization. On account of the copolymerization parameters, at this time point, the amount of vinyllactam is lower than that of hydrophobic monomer, meaning that polymer fractions would arise which comprise large fractions of hydrophobic monomer or that homopolymers of hydrophobic monomer would arise. This can be effectively avoided by metering in the vinyllactam via the reflux in order thus to ensure very effective mixing with the reflux which is rich in hydrophobic monomer without this metered addition, and thus to prevent high local concentrations of hydrophobic monomer in the reaction mixture at the point of reflux into the reaction mixture and therewith the described disadvantages.

The metering time of the vinyllactam to the reflux therefore takes place, for example, with the start of the polymerization or with the onset of reflux, where either some vinyllactam is added to the reaction mixture before or at the start of the reaction (start of the reaction is the time of the first addition of the initiator) and the remaining total amount of vinyllactam to be metered in is introduced into the reflux via continuously controlled addition (linear or nonlinear course of the amounts of vinyllactam per time unit), before it flows back into the reaction mixture or is metered into this. In another embodiment of the invention, the reaction takes place as already revealed in the prior art via a controlled addition (linear or nonlinear course of the amounts of vinyllactam or hydrophobic monomer per time unit) of the monomers using the metering schemes calculated on the basis of the copolymerization parameters. Only toward the end of the polymerization time (70 to 100% of the time for the addition of the hydrophobic monomer) does the metered addition of a further amount of vinyllactam through metered addition to the reflux of the hydrophobic monomer take place. However, this further metered addition of the vinyllactam lasts at least around 10 to 50% of the total addition time of the hydrophobic monomer longer after the end of the addition of the hydrophobic monomer and is, if appropriate, also continued until the end of the polymerization if the reflux of the hydrophobic monomer becomes weaker and can barely still be detected.

In order to ascertain the suitable amounts, the reflux profile for the desired composition is firstly ascertained in each case. For this, the concentration of the hydrophobic monomer in the reflux per time unit is determined for the entire course of the polymerization reaction. This can take place, for example, using flow meters and analysis of the content of hydrophobic monomer in the reflux.

In order to be able to control the addition of the vinyllactam more precisely and to allow as effective as possible mixing of the vinyllactam with the reflux, the is expediently configured such that the reflux takes place at one or more defined sites, e.g. from the reflux of the reflux condenser. The mixing can take place, for example, by incorporating static or mechanical mixers or by mixing under the action of waves such as, for example, ultrasound etc., via which the reflux admixed with vinyllactam flows back into the reaction solution.

Measure vi)

Measure vi) according to the invention is carried out such that, following conversion of 70 to 99% by weight of the vinyllactam used, some of the solvent is distilled off and the polymerization is continued.

The polymerization reaction is carried out at a suitable polymerization temperature and pressure in a container suitable for the polymerization. The polymerization can be carried out under reflux conditions.

According to measure vi) in accordance with the invention, an intermediate distillation of the solvent is carried out in order to deplete the hydrophobic monomer. The time point for the intermediate distillation is chosen so that, at this time point, 70 to 99% by weight of the vinyllactam are converted. The vinyllactam monomer content of the polymerization mixture can be determined externally, for example by sampling and determining the residual contents of unreacted monomer, for example by gas-chromatographic methods (GC) or solubilization-chromatographic methods (HPLC) etc. Also possible, however, is an in-situ determination via calibrated measuring probes which determine the residual contents by means of infrared, UV-vis or other optical or spectroscopic methods. Such methods and instruments are known to the person skilled in the art.

If the conversion of 70 to 99% by weight of the vinyllactam is achieved, some of the solvent and of the hydrophobic monomer that is more volatile than the vinyllactam is removed by means of thermal distillation. Ideally, here, the solvent for the polymerization is chosen such that the hydrophobic monomer has a lower boiling point than the solvent, has a comparably high boiling point (difference in the boiling points less than 10° C., preferably less than 8° C.) and/or the solvent forms an azeotrope with the hydrophobic monomer. As a result of the distillation, some of the hydrophobic monomer unreacted at this time point is removed from the reaction mixture and the concentrations of hydrophobic monomer and vinyllactam are thereby brought closer together. This distillation takes place after 70 to 130%, preferably 75 to 120%, of the total metering time of the vinyllactam. The amount of distillate here corresponds to 3 to 30%, preferably 5 to 20%, of the total amount of reaction mixture. Should the remaining reaction mixture no longer be stirrable or stirrable only with difficulty under polymerization conditions after removing solvent, it can be diluted simultaneously or subsequently with fresh solvent. The removed amount of solvent can thus be introduced again into the reaction mixture by adding fresh solvent. The addition of fresh solvent can naturally also take place without an increased viscosity rendering it necessary.

A temporal overlap of the distillation and the additional metering of vinyllactam (combination with measure ii)) is also possible and shortens the cycle time overall.

The amount to be distilled off is governed firstly by the stirrability of the reaction mixture after distillation, where the metering of solvent during the distillation keeps the viscosity in an order of magnitude handlable for normal polymerization in viscous media (less than 50 Pas at reaction temperature), and secondly by the time point of the distillation: thus, for implementation after 70% of the total metering time of the vinyllactam, the amount of distillate will be chosen to be greater than after 130% of the total metering time of the vinyllactam.

By reference to the statements made, the person skilled in the art is able to determine the amount of distillate suitable for the particular experimental set-up, batch size and concentration ratios depending on the distillation time point. Greater depletion of the hydrophobic monomer through larger amounts of distillate brings about a more certain effect of the measure.

Measure vii)

Measure vii) according to the invention is carried out such that the metered addition of the monomers takes place individually or as a mixture in pure form or diluted with solvent from below into the polymerization mixture.

The polymerization is carried out in a container suitable for the polymerization at a suitable polymerization temperature and pressure.

According to measure vii) in accordance with the invention, the metered addition of the monomers takes place individually or as a mixture in pure form or diluted with solvent (referred to below as "monomer feed") from below into the polymerization mixture and not, as is otherwise customary, from above onto the polymerization mixture. This metered addition takes place via a suitable device from below into the polymerization mixture. In this connection, from below means that the monomer feed is introduced below the surface of the liquid polymerization mixture. The monomer feed preferably takes place in the zone of greatest mixing and shearing of the liquid polymerization mixture. Where this zone is situated depends firstly on the type of stirrer used, and secondly on the reactor geometry. The zone of greatest mixing as a function of the type of stirrer chosen is known to the person skilled in the art. The person skilled in the art can also ascertain this zone in a simple manner known per se, for example via computer simulation or color distribution experiments. If there is a plurality of regions of greatest or very great mixing, it may also be expedient to introduce the monomer feed as far as possible below the liquid level in one of these zones. This maximizes the distance between the introduction site of the initiator solution, which is usually metered in from above, and the introduction site of the monomer feed.

The introduction of the monomer feed into the liquid reaction mixture can take place via customary valves suitable for introducing liquids. With the help of metering pumps, the monomer feed can be metered in continuously or in pregiven metering schemes with varying feed rates and times.

In principle, the procedure according to the invention applies for the metering of the monomer feed the monomers, if appropriate in the form of a solution in a $C_1$-$C_4$-alcohol, are metered into the reaction mixture (feed procedure). In one embodiment of the invention, up to 20 mol %, preferably up to 15 mol %, particularly preferably up to 10 mol %, of the water-soluble N-vinyllactam I (based on the total amount of N-vinyllactam I) and a small amount of the initiator solution and solvent, preferably ethanol or isopropanol, are initially introduced. The mixture is then brought to the reaction temperature and the remaining amount of monomer is metered in at the same time as the remaining initiator solution and, if appropriate, a regulator, continuously or in several portions. In general, the metered addition takes place over a period of from 2 to 14 hours, preferably 3 to 12 hours, ideally 4 to 11 hours (depending on the batch size and concentration used). The concentration of the monomers in the reaction mixture is in the range from 10 to 80% by weight, preferably 20 to 75% by weight, in particular 25 to 70% by weight, based on the reaction mixture. In this case, the initiator solution, after the reaction mixture has been brought to the desired reaction temperature, is allowed to run in continuously or in several portions, in particular over a period of from 2.5 to 16 hours, preferably 3.5 to 14 hours, in particular 5 to 12.5 hours.

The pipeline for introducing the monomer feed can of course also run through moving internals (e.g. stirrers) or fixed internals (e.g. stream breakers, internal heat exchangers etc.) to this zone of great mixing. The way in which the pipeline is run here can largely be chosen freely provided introduction takes place in a zone of great mixing below the liquid level.

If there is a plurality of areas of greatest or very great mixing, it is also expedient to introduce the monomer feed as far as possible below the liquid level. This maximizes the distance between the introduction site of the monomer feed and the initiator addition. The introduction takes place particularly preferably via the bottom area of the tank.

The monomer feed can be introduced from outside into the reaction mixture, i.e. from the tank wall, as well as from inside the tank space, by the line for introducing the monomer feed running from the tank wall or the tank lid inward and ending within the tank space in a zone which is surrounded at all reaction times by the reaction mixture and is in a zone of greatest possible mixing. In the case of anchor stirrers, the introduction can be ran, for example, from above downward in the middle zone of the tank space in the vicinity of the stirrer shaft. In the case of cross-blade stirrers, the introduction can be run from the side of the tank wall between two blades into the middle zone. If the introduction is run within the tank space into the reaction mixture, then this pipeline acts, as it were, as stream breaker and thus intensifies the desired mixing. If appropriate, in the case of such an arrangement, it may be useful to incorporate a further stream breaker as counterpiece to the introduction in order thus to install two, for example symmetrical, stream breakers (one or, if appropriate, both thereof configured as introduction) in the tank. The best arrangement and configuration as an introduction with or without a further stream breaker is governed again, depending on the tank geometry and stirrer type chosen, by the quality of the mixing, which the person skilled in the art can readily ascertain, for example, via computer simulation or color distribution experiments.

Measure viii)

Measure viii) according to the invention is carried out such that the polymerization is carried out under a superatmospheric pressure such that vaporization of the components is avoided.

The polymerization reaction is carried out in a container suitable for the polymerization.

The polymerization reaction is carried out under conditions such that reflux is avoided. In this connection, this means that the liquid polymerization mixture does not boil and the readily volatile components, such as the solvent and in particular the hydrophobic monomer or mixtures thereof, cannot vaporize and can consequently not condense again as a result of cooling. The avoidance of reflux conditions is controlled by controlling the pressure.

The reaction temperature can be 60 to 150° C., it is usually in the range from 60 to 130° C. The reaction is carried out under superatmospheric pressure. Here, the pressure is regulated so that the liquid polymerization mixture does not boil; the temperature and pressure range is chosen so that vaporization of the feed materials does not take place. This lower or higher pressure (than atmospheric pressure) which suppresses boiling can be reached by adjusting the temperature at the same volume or by increasing the pressure by injecting inert gases such as nitrogen or argon, preferably nitrogen. The person skilled in the art can ascertain suitable pressure ranges via the relative vapor pressures. Usually, the pressure here will be 0.05 to 2 MPa, preferably 0.08 to 1.2 MPa, in particular 0.1 to 0.8 MPa.

Execution Period of the Individual Measures:

Measure i) is always carried out with temporal overlap with other measures ii) to vii). However, in combination of measure i) with measure viii), execution takes place in temporally separate periods during the polymerization reaction.

Measure ii) is carried out at the time point during the polymerization reaction when at least 70 mol % of the hydrophobic monomer have completely reacted. This time point can be readily established by the person skilled in the art, e.g. by continuous or periodic sampling from the reaction container by determining the respective residual amounts of monomer directly from the container or an externally circulating cycle with sampling point or by in-process control.

Measure iii) is carried out throughout the entire polymerization time provided a reflux (measure i)) from the cooler areas in the reaction space into the reaction solution is present or would be present if measure iii) were not met.

Measure iv) is carried out throughout the entire polymerization time provided initiator is metered in (if appropriate in the form of a solution with the described solvents).

Measure v) is carried out throughout the entire polymerization time provided a reflux from the cooler areas in the reaction space into the reaction solution is present (=measure i)). For better control, it is advisable to configure the tank so that the reflux takes place at one or more defined areas, e.g. from the reflux of the reflux condenser, in order to be able to control the addition of the vinyllactam more precisely and to permit the most effective mixing possible of the vinyllactam with the reflux. This mixing can take place, for example, through the incorporation of static mixers etc., by means of which the reflux admixed with vinyllactam flows back into the reaction solution.

Measure vi) is carried out at the time point during the polymerization reaction when at least 70% by weight of the vinyllactam used has completely reacted. This time point can be readily established by the person skilled in the art, e.g. by continuous or periodic sampling from the reaction container, by determining the respective residual amounts of monomers directly from the container or an externally circulating circuit with sampling point or by in-process control.

Measure vii) is carried out throughout the entire metering time of the monomer feed.

Measure viii) can be carried out throughout the entire polymerization time. The pressure during the polymerization reaction is controlled by the reaction conditions and, if appropriate, additional pressure through inert gases such as nitrogen or argon such that vaporization of the components of the reaction mixture and, in particular, of the hydrophobic monomer (including any possible azeotropic mixtures of the hydrophobic monomer with other components) during the entire period of the polymerization reaction is avoided. Expediently, the reaction container is additionally configured so that cooler areas in the top space of the container are avoided as far as possible.

If measure viii) is not carried out during the entire polymerization time, it can be carried out with measure i) in temporally separate periods.

Combinations of Two or More Measures:

The individual measures can be combined according to the invention so that temporal overlaps of the individual measures in the course of the polymerization process are possible with the exception of the combination of measure i) and measure viii).

The time order of the indicated possible combinations of individual measures arises from the described execution periods of the individual measures.

In principle, therefore, the following measures can be combined directly with one another:

measures i) to vii)
measures ii), iv), vi), vii) and viii)

The combination of measure viii) with measure i) and measure iii) and/or measure v) is possible by subdividing the polymerization reaction into a plurality of time intervals in which measure i) and measure iii) and/or v) and measure viii) are employed successively in alternating sequence or alternating intervals once or more than once in succession. For example, at the start of the polymerization reaction, when relatively large amounts of unreacted vinyllactam are still present in the reaction mixture, the reaction can be carried out under reflux conditions (measure i)) with application of measure iii) and/or v) (the possible combination with further measures ii), iv), vi) or vii) is of course possible here and included by the method according to the invention). Upon further decrease of the vinyllactam, the pressure in the reaction container can then be increased, e.g. through injecting inert gases or rapid temperature increase with sealed reaction space, such that the vaporization of the individual components or of the azeotropic mixtures of the individual components in the further course of the reaction is avoided (avoidance of measure i)) and thus measure viii) comes to fruition.

In the case of the combination of measure iii), measure iv) and/or measure vii), the addition of the initiator solution (measure iv)) and of the reflux (measure iii)) and/or the addition of the monomer feed (measure vii)) will expediently take place at different areas in the reaction space below the liquid level of the reaction mixture in the reaction container. These various places in the reaction space are chosen according to the invention so that contact of the two or three different added streams can take place only after the most complete possible mixing of the individual added stream with the reaction mixture. For this, the person skilled in the art selects suitable regions in the reaction container in a known way. These are, for example, zones of particularly high mixing, which can be ascertained easily by color experiments or simulations. Expediently, the sites of the addition are as far as possible from one another and at any time point in the addition are below the liquid level of the reaction mixture.

According to the invention, the measures are employed individually or, preferably, in combination. Up to 8 measures can be combined during a polymerization reaction. Any combinations are possible in accordance with the conditions which apply for the individual measures.

Preferred combinations of measures are: i/ii/vi, ii/vi/viii, i/ii/iv/vi, ii/iv/vi/viii, ii/viii, vi/viii, i/ii/iv, i/ii/iii, i/ii/vii. Very particularly preferred combinations of measures are i/ii/vi, ii/vi/viii, vi/viii.

Afterpolymerization and work-up:

After the polymerization reaction, one or more polymerization initiators can, if desired, be added and the polymer solution heated, e.g. to the polymerization temperature or to temperatures above the polymerization temperature in order to complete the polymerization. Of suitability are the above-mentioned azo initiators, but also all other customary initiators suitable for a free-radical polymerization in alcoholic solution, for example peroxides, hydroperoxides, peroxodisulfates, percarbonates, peroxo esters and hydrogen peroxide or redox systems with tert-butyl hydroperoxide/sulfite. As a result, the polymerization reaction proceeds to a conversion of 99.9%. The solutions which form during the polymerization usually comprise 10 to 70% by weight, preferably 15 to 60% by weight, of polymer.

The solutions obtained can, after the polymerization, also be subjected to a physical aftertreatment, for example steam distillation or stripping with nitrogen, where the solvent or impurities that volatilize with steam are removed from the solution. Furthermore, the solutions can also be subjected to a chemical aftertreatment or bleaching with hydrogen peroxide, sodium sulfite/tert-butyl hydroperoxide and the like. The hydrolysis of the residual monomers can likewise be carried out by adding acids or bases suitable for the hydrolysis, for example acids such as formic acid, acetic acid, lactic acid, propanoic acid, oxalic acid, sulfuric acid, hydrochloric acid, phosphoric acid etc. or acidic salts thereof, or bases such as sodium hydroxide solution, potassium hydroxide solution etc. The selection is made depending on the hydrophobic monomers to be hydrolyzed and the vinyllactam used.

If desired, the solvents used during the polymerization and/or afterpolymerization can be removed and replaced with another solvent, for example water, for example by steam distillation. Further methods are known to the person skilled in the art. It is likewise conceivable to convert the alcoholic solution directly or an aqueous solution obtained by solvent exchange into solid powders by drying methods known to the person skilled in the art and corresponding to the prior art, and thus to obtain powder products.

Preferred methods are, for example, spray-drying, fluidized-bed spray drying, drum drying and belt drying. It is likewise possible to use freeze-drying and freeze-concentration or blade dryers. Preference is given to drying from aqueous solutions that still comprise only small amounts of organic solvents.

The method according to the invention ensures that during the polymerization reaction, a constant concentration of the two comonomers can always be maintained and no absolute or local increase in the concentration of only one of the monomers takes place or is at least significantly restricted in order, as described, to prevent the formation of water-insoluble homopolymers or copolymers which are very rich in hydrophobic monomers.

The resulting polymers generally have a K value (determined at 25° C. in a 1% strength by weight aqueous or ethanolic solution) in the range from 10 to 100, in particular 15 to 90 and particularly preferably 20 to 80. The determination of the K value is described in H. Fikentscher "Systematik der Cellulosen auf Grund ihrer Viskosität in Lösung [Systematics of celluloses based on their viscosity in solution]", Cellulose-Chemie 13 (1932), 58-64 and 71-74, and Encyclopedia of Chemical Technology, Vol. 21, 2nd edition, 427-428 (1970).

A measure of their clear solubility is the nephelometric turbidity unit FNU (or NTU), which is measured at 25° C. in a 5% strength by weight aqueous solution of the polymer and is fixed by calibration with formazin as artificial opacifier. The precise method is given in the course of the examples below. The polymers obtained according to the invention have an FNU value of <10, preferably <5, particularly preferably <2.

The polymers obtained by the method according to the invention are used in particular in cosmetic and pharmaceutical preparations, for example as thickeners or film formers in hair lacquer additives, hair setting additives or hair spray additives, in skin cosmetic preparations, immunochemicals or as active-ingredient-releasing agent in pharmaceutical preparations. In addition, the polymers produced according to the invention can be used as auxiliaries for agrochemistry, for example for seed coating or for slow-release fertilizer formulations. The polymers are also suitable as coatings for industrial applications, for example for the coating of paper or plastics or for hot-melt adhesives. Furthermore, these polymers are suitable as binders for transfer printing, as lubricant additives, as rust inhibitors or rust removers from metallic surfaces, as scale inhibitors or scale removers, as auxiliaries during the recovery of petroleum from oil-containing water, as auxiliaries during the production of petroleum and natural gas, and the transportation of petroleum and natural gas, as cleaners of waste-waters, as adhesive raw materials, as detergent additives, and as auxiliaries in the photographic industry.

The invention will now be described in further detail with reference to the following non-limiting examples.

EXAMPLES

The turbidity of the aqueous copolymer solution was determined by nephelometric turbidity measurement (modified method according to DIN 38404). In this method, the light scattered by the measurement solution is determined photometrically, light scattering being caused by the interaction between the light beams and the particles or droplets in solution, the number and size of which constitute the degree of turbidity. The quantity being measured here is the nephelometric turbidity unit FNU (or NTU), which is measured at 25° C. in a 5% strength by weight aqueous solution of the polymer and is fixed by calibration with formazin as artificial opacifier. The higher the FNU value, the more turbid the solution.

General Procedure for Examples 1 to 6:

| Feed material allocation | | Amount | Unit |
|---|---|---|---|
| Initial charge | of feed 1 | 78.4 | g |
| | of feed 2 | 3.2 | g |
| Feed 1 | isopropanol | 300 | g |
| | vinylpyrrolidone | 333.2 | g |
| | vinyl acetate | 266.7 | g |
| Feed 2 | isopropanol | 50 | g |
| | tert-butyl perpivalate 75% | 2 | g |
| Feed 3 | vinylpyrrolidone | 66.6 | g |
| Feed 4 | isopropanol | 50 | g |
| | tert-butyl perpivalate 75% | 2 | g | tert-Butyl perpivalate: 75% in mineral oil (Trigonox ® 25)

The polymerization was carried out in a stirred tank with a volume of 4.5 l. The initial charge was flushed with nitrogen for 10 min and then heated to the polymerization temperature (internal temperature). At the polymerization temperature minus 10%, feeds 1 and 2 were started. Feed 1 was metered in in v h, feed 2 in x h. When feed 1 was complete, feed 3 was metered in in y h. The mixture was then afterpolymerized for 1 h and then the stated amount of distillate was distilled off. Then, if necessary, the mixture was diluted with solvent in order to maintain stirrability, and heated to an internal temperature of polymerization temperature plus 10° C. As soon as this temperature was reached, feed 4 was metered in in z h at this temperature. When feed 4 was complete, the mixture was afterpolymerized for a further 2 h at this temperature. The majority of the solvent was then removed by distillation, and residual amounts were removed by means of steam distillation. During the steam distillation, water was added as required to maintain stirrability. After cooling, water was used, if appropriate, to establish the respective solids content.

Solids content in % by weight.

K value measured 1% strength in ethanol

GC analysis: vinylpyrrolidone in ppm; vinyl acetate in ppm;

Appearance: color, clarity, FNU value

Examples 1, 2, 3, 5: Measure i), ii) and vi) with varying feed times and amounts of distillate:

Examples 4, 6: Combination of measures i), ii), iv) and vi)

TABLE 1

| Example No. | K value | VP ppm | Vac ppm | FTU value 5% in water | v [h] | x [h] | y [h] | z [h] | Temp. °C. | Amount of distillate [g]; ca. | Measures |
|---|---|---|---|---|---|---|---|---|---|---|---|
| 1 | 33 | 14 | <10 | 3.5 | 11 | 11 | 2.5 | 4 | 83 | 80 | i/ii/vi |
| 2 | 32 | 31 | <10 | 2.5 | 11 | 11 | 2.5 | 4 | 83 | 160 | i/ii/vi |
| 3 | 32 | 16 | <10 | 3 | 5.5 | 8 | 2 | 2.5 | 83 | 80 | i/ii/vi |
| 4 | 32 | 11 | <10 | 1.5 | 5.5 | 8 | 2 | 2.5 | 83 | 80 | i/ii/iv/vi |
| 5 | 32 | <10 | <10 | 1.5 | 5.5 | 8 | 2 | 2.5 | 75 | 160 | i/ii/vi |
| 6 | 33 | <10 | <10 | <1 | 5.5 | 8 | 2 | 2.5 | 75 | 160 | i/ii/iv/vi |

Appearance of the resulting aqueous polymer solutions;

1: yellowish, clear
2: yellowish, clear
3: slightly yellowish, clear
4: slightly yellowish, clear
5: slightly yellowish, clear
6: slightly yellowish, clear Examples 7-33, see Table 2 below. The formulation and amounts for Examples 7 to 33 are calculated starting from the formulation and amounts for Examples 1-6 and corresponding to the batch sizes stated for the respective Examples 7-33.

Explanation of the notes in the table below:

TABLE 2

| Example Number | VP/VA wt. %/wt. % | Batch g | K value | VP ppm | VAc ppm | FTU value 5% in water | Feed time feed 1 VP + VAc h | Feed time feed 2 initiator h | Feed time feed 3 VP h |
|---|---|---|---|---|---|---|---|---|---|
| 7 | 60:40 | 2000 | 32 | 32 | 11 | 15.0 | 11 | 11 | 2.5 |
| 8 | 60:40 | 2000 | 32 | 14 | <10 | 5.0 | 11 | 11 | 2.5 |
| 9 | 60:40 | 2000 | 32 | 9 | <10 | 2.3 | 5.5 | 8 | 2 |
| 10 | 60:40 | 2000 | 31 | <50 | <10 | 4.3 | 5.5 | 8 | 2 |
| 11 | 50:50 | 2000 | 35 | <50 | <10 | 2.4 | 5.5 | 8 | 2 |
| 12 | 50:50 | 2000 | 32 | <50 | <10 | 4.1 | 5.5 | 8 | 2 |
| 13 | 60:40 | 2500 | 32 | <50 | <10 | 3.5 | 5.5 | 8 | 2 |
| 14 | 60:40 | 2500 | 32 | <50 | <10 | 1.3 | 5.5 | 8 | 2 |
| 15 | 30:70 | 2000 | 34 | <50 | <10 | 2.1 | 5.5 | 8 | 2 |
| 16 | 30:70 | 2000 | 32 | <50 | <10 | 2.4 | 5.5 | 8 | 2 |
| 17 | 30:70 | 2500 | 32 | <50 | <10 | 3.5 | 5.5 | 8 | 2 |
| 18 | 30:70 | 2500 | 32 | <50 | <10 | 1.2 | 5.5 | 8 | 2 |
| 19 | 60:40 | 2000 | 36 | <50 | <10 | 2.1 | 5.5 | 8 | 2 |
| 20 | 60:40 | 2000 | 32 | <50 | <10 | 2.0 | 5.5 | 8 | 2 |
| 21 | 60:40 | 2500 | 33 | <5 | <10 | <1 | 5.5 | 8 | 2 |
| 22 | 60:40 | 2500 | 32 | <10 | <10 | <1 | 5.5 | 8 | 2 |
| 23 | 60:40 | 2600 | 35 | 17 | <10 | <1 | 5.5 | 8 | 2 |
| 24 | 60:40 | 2600 | 30 | <10 | <10 | <1 | 5.5 | 8 | 2 |
| 25 | 70:30 | 2500 | 33 | 12 | <10 | <1 | 5.5 | 8 | 2 |
| 26 | 50:50 | 2500 | 33 | <10 | <10 | <1 | 5.5 | 8 | 2 |
| 27 | 30:70 | 2500 | 32 | <10 | <10 | 1.2 | 5.5 | 8 | 2 |
| 28 | 60:40 | 2000 | 32 | 11 | <10 | <1 | 5.5 | 8 | 2 |
| 29 | 60:40 | 2600 | 31 | 14 | <10 | 4.5 | 5.5 | 8 | 2 |
| 30 | 60:40 | 2600 | 33 | 15 | <10 | 4.0 | 5.5 | 8 | 2 |
| 31 | 60:40 | 2000 | 36 | <10 | <10 | 2.0 | 5.5 | 8 | 2 |
| 32 | 60:40 | 2000 | 32 | <50 | <10 | 2.3 | 5.5 | 8 | 2 |
| 33 | 50:50 | 2000 | 34 | <50 | <10 | <1 | 5.5 | 8 | 2 |

| Example Number | Feed time feed 4 initiator h | Poly. temp. °C. | Amount of distillate g (ca.) | Amount of distillate % based on batch | Super-atmos. pressure note 1) bar | Other | Measures |
|---|---|---|---|---|---|---|---|
| 7 | 4 | 83 | 250 | 12.5 | 0 | note 2) | i/ii/(iv)/vi |
| 8 | 4 | 83 | 130 | 6.5 | 0 | | i/ii/vi |
| 9 | 2.5 | 83 | 130 | 6.5 | 0 | | i/ii/iv/vi |
| 10 | 2.5 | 83 | 130 | 6.5 | 0 | | i/ii/vi |
| 11 | 2.5 | 83 | 130 | 6.5 | 0 | | i/ii/iv/vi |
| 12 | 2.5 | 85 | 130 | 6.5 | 0 | | i/ii/vi |
| 13 | 2.5 | 75 | 300 | 12.0 | 0 | | i/ii/vi |
| 14 | 2.5 | 75 | 300 | 12.0 | 0 | | i/ii/iv/vi |
| 15 | 2.5 | 83 | 130 | 6.5 | 0 | | i/ii/iv/vi |
| 16 | 2.5 | 83 | 130 | 6.5 | 0 | | i/ii/vi |
| 17 | 2.5 | 75 | 300 | 12.0 | 0 | | i/ii/vi |

TABLE 2-continued

| | | | | | | | |
|----|-----|----|-----|------|-----|---------|------------------|
| 18 | 2.5 | 75 | 300 | 12.0 | 0   |         | i/ii/iv/vi       |
| 19 | 2.5 | 83 | 140 | 7.0  | 0   |         | i/ii/iv/vi/vii   |
| 20 | 2.5 | 84 | 140 | 7.0  | 0   |         | i/ii/iv/vi/vii   |
| 21 | 2.5 | 70 | 300 | 12.0 | 2.8 |         | ii/iv/vi/viii    |
| 22 | 2.5 | 70 | 300 | 12.0 | 2.8 |         | ii/vi/viii       |
| 23 | 2.5 | 70 | 220 | 8.5  | 2.8 |         | ii/vi/viii       |
| 24 | 2.5 | 70 | 260 | 10.0 | 2.8 |         | ii/vi/viii       |
| 25 | 2.5 | 70 | 220 | 8.8  | 2.8 |         | ii/vi/viii       |
| 26 | 2.5 | 70 | 220 | 8.8  | 2.8 |         | ii/vi/viii       |
| 27 | 2.5 | 70 | 220 | 8.8  | 2.8 |         | ii/vi/viii       |
| 28 | 2.5 | 70 | 140 | 7.0  | 0.3 | note 3) | ii/vi/viii       |
| 29 | 2.5 | 70 | 0   | 0.0  | 1   |         | ii/viii          |
| 30 | 2.5 | 70 | 0   | 0.0  | 2.8 |         | ii/viii          |
| 31 | 2.5 | 83 | 140 | 7.0  | 0   |         | i/ii/iii/iv/vi/vii |
| 32 | 2.5 | 83 | 130 | 6.5  | 0   |         | i/ii/v/vi        |
| 33 | 2.5 | 83 | 130 | 6.5  | 0   |         | i/ii/v/vi        |

Note 1) = Note: the pressure is the superatmospheric pressure above atmospheric pressure
Note 2) = Note: initiator was passed into the solution from above via inlet tube; introduction was after half fill-amount below the liquid level
Note 3) = Note: pressure was adjusted by injecting nitrogen.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of producing a vinyllactam copolymer, the method comprising:
   providing at least one water-soluble N-vinyllactam;
   providing at least one hydrophobic comonomer; and
   subjecting the at least one water-soluble N-vinyllactam and the at least one hydrophobic comonomer to free-radical polymerization in an organic solvent in the presence of an initiator, under a combination of process measures selected from the group consisting of A and B; wherein:
   (A) comprises (i) polymerization under reflux, (ii) an addition of at least 5 mol% of N-vinyllactam to the polymerization mixture if at least 70 mol% of the total amount of hydrophobic monomer used have completely reacted, and at least one of (iii), (iv), (v), (vi), and (vii), wherein (iii) comprises return of condensate formed in the reflux from below to the polymerization mixture, (iv) comprises introduction of the initiator in the form of a solution in an organic solvent from below into the polymerization mixture, (v) comprises addition of N-vinyllactam to the reflux, (vi) comprises distilling off a portion of the organic solvent and continuing the polymerization following conversion of 70 to 99% by weight of the N-vinyllactam used, and (vii) comprises introduction of at least one monomer from below into the polymerization mixture; and wherein
   (B) comprises (ii) and (viii) polymerization under a superatmospheric pressure such that vaporization of the polymerization components is avoided.

2. The method according to claim 1, wherein the hydrophobic comonomer used has a solubility in water of 1 to 100 g/l.

3. The method according to claim 1, wherein the hydrophobic comonomer used has a boiling point at atmospheric pressure of 60 to 150° C.

4. The method according to claim 1, wherein the at least three process measures (A) are carried out simultaneously or successively.

5. The method according to claim 1, wherein the hydrophobic comonomer used comprises a monomer selected from the group consisting of vinyl acetate, vinyl propionate, methyl acrylate, ethyl acrylate, n-propyl acrylate, n-butyl acrylate, t-butyl acrylate, methyl methacrylate, ethyl methacrylate, acrylonitrile and methacrylonitrile.

6. The method according to claim 1, wherein the hydrophobic comonomer used comprises vinyl acetate.

7. The method according to claim 1, wherein the N-vinyllactam used comprises a monomer from the group consisting of N-vinylpyrrolidone, 3-methyl-N-vinylpyrrolidone, 4-methyl-N-vinylpyrrolidone, 5-methyl-N-vinylpyrrolidone, N-vinylpyridone, N-vinylpiperidone and N-vinylcaprolactam.

8. The method according to claim 1, wherein the N-vinyllactam used comprises N-vinylpyrrolidone.

9. The method according to claim 1, wherein the polymerization is carried out at a temperature of 60 to 150° C.

10. The method according to claim 1, wherein the organic solvent used comprises an alcohol.

11. The method according to claim 1, wherein measures ii), vi) and viii) are combined.

12. The method according to claim 1, wherein measures i), ii), iv) and vi) are combined.

13. The method according to claim 1, wherein measures ii), iv) and vi) and viii) are combined.

14. The method according to claim 1, wherein measures ii) and viii) are combined.

15. The method according to claim 1, wherein measures i), ii) and iv) are combined.

16. The method according to claim 1, wherein measures i), ii) and iii) are combined.

17. The method according to claim 1, wherein measures i), ii) and vii) are combined.

18. The method according to claim 1, wherein measures i), ii) and vi) are combined.

19. The method according to claim 1, wherein the polymerization is carried out at a pressure of 0.05 to 2 MPa.

20. The method according to claim 1, wherein the polymerization is carried out under a protective gas.

21. A method of producing a vinyllactam copolymer, the method comprising:
   providing at least one water-soluble N-vinyllactam;
   providing at least one hydrophobic comonomer; and
   subjecting the at least one water-soluble N-vinyllactam and the at least one hydrophobic comonomer to free-radical polymerization in an organic solvent in the presence of an initiator, under a combination of process measures selected from the group consisting of A and B; wherein:

(A) comprises (i) polymerization under reflux, (ii) an addition of at least 5 mol% of N-vinyllactam to the polymerization mixture if at least 70 mol% of the total amount of hydrophobic monomer used have completely reacted, and at least one of (iii), (iv), (v), (vi), and (vii), wherein (iii) comprises return of condensate formed in the reflux from below to the polymerization mixture, (iv) comprises introduction of the initiator in the form of a solution in an organic solvent from below into the polymerization mixture, (v) comprises addition of N-vinyllactam to the reflux, (vi) comprises distilling off a portion of the organic solvent, replacing at least a portion of the removed solvent with new organic solvent, and continuing the polymerization following conversion of 70 to 99% by weight of the N-vinyllactam used, and (vii) comprises introduction of at least one monomer from below into the polymerization mixture; and wherein (B) comprises (ii) and (viii) polymerization under a superatmospheric pressure such that vaporization of the polymerization components is avoided.

22. The method according to claim 1, wherein (B) further comprises at least one of (i), (iii), (iv), (v), (vi), and (vii), with the proviso that a combination of (viii) with any of (i), (iii) or (v) is carried out sequentially.

\* \* \* \* \*